(12) United States Patent
Westcott et al.

(10) Patent No.: US 8,537,433 B2
(45) Date of Patent: Sep. 17, 2013

(54) FORWARD FACING SCANNER

(75) Inventors: Robert M. Westcott, Holley, NY (US); Jude A. SanGregory, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 217 days.

(21) Appl. No.: 13/094,218

(22) Filed: Apr. 26, 2011

(65) Prior Publication Data

US 2012/0274995 A1    Nov. 1, 2012

(51) Int. Cl.
*H04N 1/04* (2006.01)

(52) U.S. Cl.
USPC ........... 358/474; 358/497; 358/496; 358/498; 358/408

(58) Field of Classification Search
USPC ......... 358/474, 496, 497, 498, 408; 399/379, 399/380, 364, 374, 211, 212; 355/23, 24; 250/234–236, 239, 216; 382/312, 318, 319
See application file for complete search history.

(56) References Cited

U.S. PATENT DOCUMENTS

| | | | |
|---|---|---|---|
| 6,400,472 B1 * | 6/2002 | Yoshimizu | 358/498 |
| 7,804,628 B2 * | 9/2010 | Hashimoto et al. | 358/494 |
| 2010/0149608 A1 | 6/2010 | Chen et al. | |
| 2010/0245946 A1 | 9/2010 | Takeuchi et al. | |
| 2012/0274994 A1 * | 11/2012 | Westcott et al. | 358/498 |

FOREIGN PATENT DOCUMENTS

JP    2001274935 A  * 10/2001

* cited by examiner

*Primary Examiner* — Cheukfan Lee
(74) *Attorney, Agent, or Firm* — Eugene Shkurko; Amit Singhal

(57) ABSTRACT

An ergonomic, compact scanner operation is achieved by providing a flatbed scanner and a sheet fed scanner in a space efficient arrangement with optimal access features for users. Documents traverse the sheet fed scanner along a path that allows inclusion of an easily accessible flat bed scanner.

8 Claims, 13 Drawing Sheets

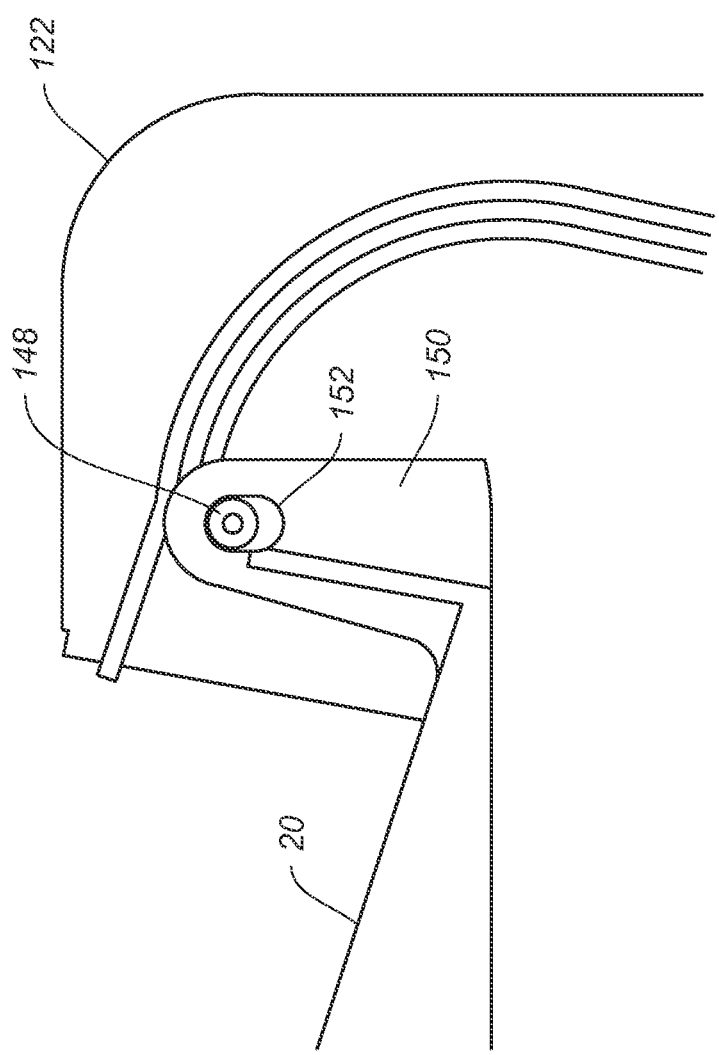

FORWARD FACING SCANNER

CROSS REFERENCE TO RELATED APPLICATIONS

Reference is made to commonly assigned, co-pending U.S. patent application Ser. No. 13/094,200 by Westcott et al. filed of even date herewith titled "Forward Facing Scanner", the disclosure of which is incorporated herein by reference in its entirety.

FIELD OF THE INVENTION

A document scanner is desired that has the ability to scan a variety of different document types and sizes. Further, the scanner is desired to have the ergonomic capabilities of a duplex C-transport sheet fed scanner to scan stacks of documents and the function of a flatbed scanner to scan irregular, thick or bound documents or other items. It is desired that these capabilities be combined into a single, forward-facing, compact desktop machine.

BACKGROUND OF THE INVENTION

Sheet fed scanners have become a popular computer peripheral for creating digital images from documents in both the home and the office. With respect to sheet fed scanners, an image forming subsystem, such as a camera, typically a charged couple device (CCD) and a lens in combination with an illumination source, sits in a stationary position and scans an image as a sheet of paper is moved past the camera, through a narrow transport path, by a paper transport mechanism. Individual raster lines are imaged by the camera and then pieced together to create a two-dimensional (2D) image representation of the original document. The camera is basically imaging one sliver of the document many times as the document is moved past the camera. The paper motion supplies one dimension of the document image, while the width is supplied by the camera. The in-paper travel direction and the width of the document are determined by the optics magnification and the dimensions of the CCD within the image forming subsystem. In alternative designs, a CIS or Contact Image Sensor is substituted for the CCD Lens Reduction form of camera or imager. The CIS device utilizes a number of smaller CCD elements chained together to form a full width imager. This eliminates the need for a reduction lens which is replaced by a self-focusing one of essentially 1:1 magnification. Both forms of cameras or imagers are commonly applied in sheet fed scanners as well as flat bed scanning equipment. In some cases, the shape of the sheet fed scanners paper path is semi-circular. For example, some scanners have a semi-circular paper path wherein sheets can be fed from a tray on top and exit beneath, or vice versa. In other cases, the paper path is "straight through."

In some cases, the scanner has two cameras, one for imaging the front side of the sheet or document, the other for imaging the rear side of the sheet or document. Scanners of this form are typically referred to as single pass duplex in that they can image both sides of a document with one pass of the document through the paper transport. Sheet fed scanners employing only one imager are generally referred to as Simplex scanners. In some scanners with one imager or camera, the paper path is designed in a way to provide the ability to turn the sheet over thereby allowing for imaging of both sides, but this must be done in a second or reversing pass of the document, with a penalty of increased scan time.

FIG. 1 shows a typical sheet fed scanner with a C-shaped paper path and two cameras for duplex scanning of documents. To scan a stack of documents, a human operator places a stack of documents 10, face up, on elevator input tray 11 and initiates a scan command through an attached computer (not shown) or a button or control panel (not shown) on the scanner. Drive rollers 16 begin to continuously rotate in direction 103. Paper present sensor 17 determines that documents are in elevator input tray 11 and a motor (not shown) raises the tray to position the top of stack 10 against urging roller 13. A motor and/or clutch (not shown) rotate urging rollers 13 and feed rollers 15 to pull the top document from stack 10 and move it into the continuously rotating transport rollers 16 which transport the document through curved transport path (C-shaped) 14 in direction 110.

The documents are imaged by cameras 18 and 19 as they are pulled through the transport path 14. Cameras include one or more illumination sources 196 that illuminate documents to be imaged by an electronic image sensor 192. The image sensor can be a contact image sensor (CIS) or a charge-coupled device (CCD). In the case of a CCD imager, the camera typically includes a lens 198 and one or more mirrors 194 to fold the light path 199 between the imager and the document and create a more compact camera.

Scanned documents 12 are stacked face down in exit tray 20, in the same order as they were fed into the scanner and scanned. When paper edge sensor 101 detects the lead edge of a document, the urging rollers and feed rollers are stopped from rotating to prevent feeding of more than one document. At this point, feed rollers 16 continue to rotate and pull the document through the urging rollers and feed rollers. After the trail edge of the document passes by paper edge sensor 101, the urging rollers 13 and feed rollers 15 are again rotated (by motor and/or clutch not shown) to start moving the next document on the top of stack 10 into transport path 14. In this way, documents are moved one at a time past cameras 18 and 19 to be imaged. Urging roller 13 is mounted to a housing 191 that freely pivots around the axis of the upper feed roller 15, which is attached to the pod portion. Therefore as documents are fed from stack 10, urging roller 13 drops by gravity onto the next document at the top of stack 10. Stack-up sensor 102 detects when urging roller 13 (or its surrounding parts) drops below an optimal range for feeding documents. When this occurs, elevator 11 is raised by a motor (not shown) until stack-up sensor 102 detects that the stack is again in an optimal feeding position.

With reference to FIG. 2, scanners with a C-shaped transport typically have a stationary base portion 122 and a moveable pod portion 120 that is connected by a hinge to the base. The pod can be lifted away from the base on its hinge to allow cleaning of cameras or to remove documents that may become jammed in the transport path. FIG. 2 shows a C-shaped sheet fed scanner with a pod portion 120 attached to a base portion 122 at hinge 124 with the pod in an open position. Such sheet fed designs are referred to as C shaped or "rotary" within the industry.

FIG. 3 shows a typical sheet fed scanner with a straight though paper path and two cameras (duplex) for scanning both sides of documents. Documents 10 are moved through a straight transport path 15 by a series of drive rollers 16 to be imaged by cameras 18 and 19. In this case, documents 10 are pulled from the bottom of the input stack and are stacked 12 in exit tray 20 in the same order. Document stacks must be fed face down in order to scan them in the order in which they are stacked. If a straight through path were to be fed documents in a face up orientation, then the last document in the stack would be the first document scanned. The result would be that the scan order would be reversed from the stack order 12 in the scanner shown in FIG. 3. In applications where many documents are scanned, customer expectations require that the original order be maintained. This is especially important in helping the customers recover from any jam, stoppage or other events that would require starting over or executing a "rescan".

There are several customer usage benefits to the C or "rotary" design as compared to a straight through sheet fed scanner design. Since many of these advantages deliver improved productivity and improved ergonomics they become much more important in applications where many documents need to be scanned. Within the industry of production scanning where customers expect to scan more than a few tens or few hundreds of documents per day, the rotary or C shaped transport designs are the dominant product configuration. Following are some of the usage benefits of a Rotary or C shaped transport design.

Given the customer requirement to deliver the sheets to an exit tray in the same order as they were scanned, the options are to feed them through a straight path face down using a feeder that pulls the intended sheets into the transport from the bottom of the stack or use a C shaped transport where the sheets can be pulled from the top of stack. Pulling the sheets off of the top of the stack or a "top feeder" is advantaged in that it allows customers to place their documents into the tray face up. This is preferred because it is the normal way that customers read, prepare and handle multi page documents. It also allows the customer to observe how each sheet is to be treated as it enters the scanner. In the event that they observe a document beginning to be damaged or otherwise improperly fed, the operator may be able to intervene and correct a problem before it happens or before it has become more serious. In a bottom feeder, the operator must take the extra step to turn their documents over when placing them into the stack and they cannot as easily observe or intervene with sheets as they are fed from the bottom of the stack. In addition, feeding from the top of the stack is generally proven to be of higher reliability than feeding from the bottom of a stack. This is primarily due to the fact that each sheet in a top feeder has the same drag loads to overcome in order to advance it into the paper transport. In bottom feeding devices these drag forces are variable and dependent on how much stack resides above the sheet being fed. Each sheet being fed from beneath a stack must overcome the added drag forces incurred because of the weight of those sheets above it. This drives another key benefit of the top feeding approach which is capacity. Since top feeders do not have to contend with the weight of the stack, it is much easier to design top feeding systems using an elevating table with high stack capacities. Within the industry, top feeding devices are commonly delivered with stack capacities of 250, 500 or even 1,000 sheets while nearly all bottom feeding devices are limited to capacities of 50 to 150 sheets because of the stack drag force problem.

Another key benefit to the C or rotary design is in the ergonomic placement of the trays for in feed and exit. In the most ergonomic configurations, the C shape designs place the in-feed tray at a position close to the table or desk surface and the exit tray above it with the C shape paper path between them, such as shown in FIG. 1, for example. It is also preferred that both of these trays are oriented with both trays facing the seated operator. This configuration allows for optimum interaction with the feed and exit trays with minimal reach between them to load and unload documents. While a C design can also be offered with the in feed tray on top and the exit tray at the bottom, the preferred design places the in feed tray close to the desk surface since most scanner interventions occur in the in-feed tray. By configuring this tray closer to a table top surface, it minimizes the lifting of the arms and hands to elevated positions in order to perform the scanning operations. Performing repetitive operations with the hands well above the desk surface has been proven to increase operator fatigue, discomfort and injuries to the neck and shoulders. In some scanner designs the in feed and exit trays are oriented in a sideways arrangement. This creates an awkward process for loading and unloading the documents.

In addition to the ergonomic benefits described for operating the scanner, a C or rotary design has the ability to provide optimal access to the entire paper path length when it must be opened up for jam clearance and or maintenance. In the typical C or Rotary design, the entire paper path can be opened or exposed by unlatching the pod and hinging it upward. When offered with this path oriented to face the seated operator, this arrangement offers excellent visual and manual access to the paper path. In some scanners of different configurations, the operator must open and close several sections of the paper path in order to gain visual and manual access and some of these are not easily accessible from a seated position.

In summary, a forward facing C shaped transport with the in-feed tray close to table height and the exit tray above it, which opens up through one hinge affords an optimal design for feeding reliability, capacity, desk space and ergonomics for operation and maintenance.

FIG. 4 shows a typical flatbed scanner. In a flatbed scanner, a single document 34 is placed face down onto a transparent glass 40. The document is held flat to the glass by a pad 36 that is secured to the underside of cover 38. Camera 30 is moved linearly along shaft 32 by a motor drive system (not shown) to image the document. Cover 38 is typically mounted to a scanner main body 31 with one or more hinges 42 that allow the cover to be rotated open in a direction 35 for document placement. Hinges 42 typically include sliding members 44 that are free to move in vertical slots 46 in the main body. This allows the cover to fully seat against thick or irregularly shaped documents or other items. Because they are not restricted by a narrow document transport path, flatbed scanners are able to scan documents and items not able to be transported through a sheet fed scanner, such as books, thick documents, and three-dimensional objects. In production scanning applications, the majority of all documents are able to be fed using a sheet fed scanner and this is far more productive than using a flat bed. However, some "exception" documents, such as those of irregular dimensions, are encountered that require the use of a flatbed type scanner. It is therefore desirable to create a product design that can optimize both of these capabilities into one device while maintaining the key advantages of each.

Product solutions currently exist that have some, but not all of the desired benefits of a C-shaped sheet fed scanner and a flatbed scanner in a compact size. One common method is to tether a flatbed scanner to a C-shaped sheet fed scanner. This method requires two separate devices and occupies a significant amount of desk space. FIG. 5 shows one such combination in which flatbed scanner 44 is connected to sheet fed scanner 42 by tether cable 46. The cable provides an electronic digital communication medium between the scanners.

FIG. 6 shows another scanning system that combines a straight-through sheet fed scanner with a flatbed scanner. In this case, straight through sheet fed scanner 506, with input tray 502 and output tray 504, is mounted onto cover 510 of flatbed scanner 508. Cover 510 pivots about a hinge axis 512 to provide document access to the flatbed. This has the disadvantages of the straight through sheet fed scanner and has the ergonomic issue of requiring a human operator to lift a heavy scanner in order to access the flatbed for document placement.

In another configuration, a rotary scanner is placed atop a flatbed design. FIG. 7 depicts this approach in which C-shaped sheet fed scanner 162 is positioned above flatbed scanner 168. Sheet fed output tray 164 serves as a cover to flatbed 168 and is opened by rotating about the horizontal hinge axis 163 in direction 165. Sheet fed input tray 166 extends above the flatbed and must be moved in direction 169 before the flatbed cover 164 can be opened. This is because the operating position of the input tray blocks the movement of the output tray as it is opened in direction 165. In this design the ergonomic access to the input and output trays is suboptimum because they are loaded sideways and are elevated substantially from the desktop surface. The portion of this figure that is facing the viewer is deemed the front of the scanner, thus, the flatbed scanner is facing the front of the scanner apparatus because its cover 164 opens toward the front, while the output 164 and input 166 trays are facing a lateral side of the scanner because documents enter and exit the scanner in directions away from and toward that side, which is the right side of the scanner in FIG. 7.

SUMMARY OF THE INVENTION

In a preferred embodiment of the present invention, a flatbed scanner is integrated into a forward-facing C-shaped sheet fed scanner in a location above the sheet fed cameras and below the document output tray. The output tray also serves as the flatbed cover and pivots about an axis near or coincident with the pod pivot.

A preferred embodiment of the present invention includes providing a flatbed scanner and a sheet fed scanner, an input tray for holding documents to be fed into the sheet fed scanner, and transporting the documents from the input tray along a transport path under the flatbed scanner, which path includes a pair of imaging devices for scanning different sides of the documents. The path then curves upward behind the flatbed scanner and again curves toward a front side of the flatbed/sheet fed scanner combination toward an output tray above the flatbed scanner. Rollers are used to pull the documents from the input tray into the transport path and also along the transport path all the way out to the output tray. In the present inventive design, the output tray also serves as a rotatable cover for the flatbed scanner.

Another preferred embodiment of the present invention includes affixing hinge mechanisms to a base portion of a scanner apparatus and rotatably attaching a pod portion to the hinge mechanisms. The pod portion includes a built-in flatbed scanner. A cover is attached to the same hinge mechanisms for covering the platen of the flatbed scanner and is also used for securely holding documents, books, or other items against the platen of the flatbed scanner during scanning. The cover and the pod portion are each separately rotatable about the axis that is created by the hinge mechanisms, because the hinge mechanisms are collinearly aligned as attached to the scanner apparatus. A transport path is formed in the region where the pod portion meets the base portion, and is exposed when the pod portion is rotated in an upward direction away from the base portion. The transport path includes one or more cameras for scanning one or more sides of the documents traveling through the transport path. Input and output trays serve to hold documents that are being fed into the scanning apparatus and that have been scanned by the sheet fed scanning portion.

Another preferred embodiment of the present invention includes providing a scanning machine having a sheet fed scanner and a flatbed scanner. An input tray is provided for supporting a document that is to be automatically fed into the scanning machine. One or more imaging devices along the transport path below the flatbed scanner image one or more sides of documents. The imaged documents continue along the transport path and are ejected into an output tray above the flatbed scanner. The output tray is attached to the scanning machine such that the output tray is rotatable to an open position to expose a platen of the flatbed scanner and is rotatable to a closed position to cover the platen. The flatbed scanner is built into a pod portion of the scanning machine and is rotatable to an open position to expose the transport path. The output tray and the pod portion are attached to the same hinge mechanism so that the output tray and the pod portion rotate together or independently about the same axis. A pad is affixed to the bottom surface of the output tray to provide a flexible surface that contacts the platen when the output tray is rotated to the closed position.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

FIG. 16 illustrates one of the pair of hinge mechanisms of the scanner system of FIG. 8.

DETAILED DESCRIPTION OF THE INVENTION

The invention is disclosed herein as being embodied preferably in a document scanner. Because the features of a document scanner are generally known, as exemplified by the description above, the description which follows is directed in particular only to those elements forming part of or cooperating directly with a preferred embodiment of the present invention. It is to be understood, however, that various elements of the preferred embodiments described herein may take various forms known to a person of ordinary skill in the art.

Figure 1:
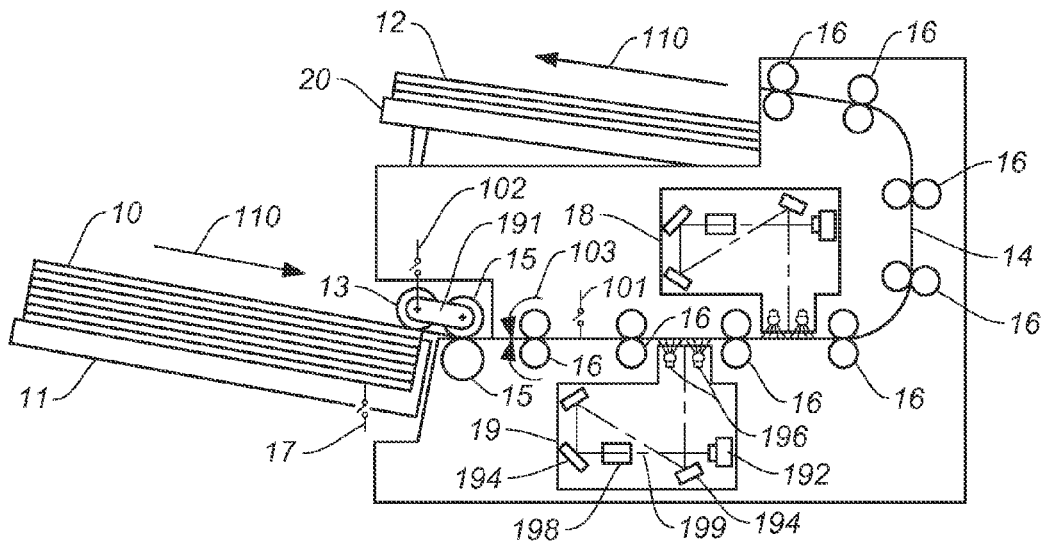
FIG. 1 illustrates a prior art scanner with C-shaped paper path.
Figure 2:
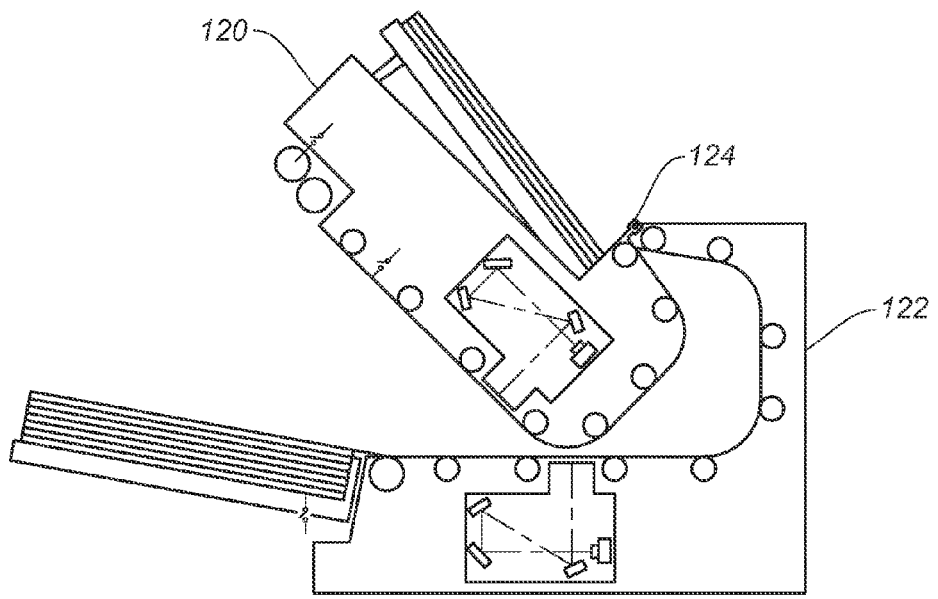
FIG. 2 illustrates the prior art scanner of FIG. 1 in a pod open position.
Figure 3:
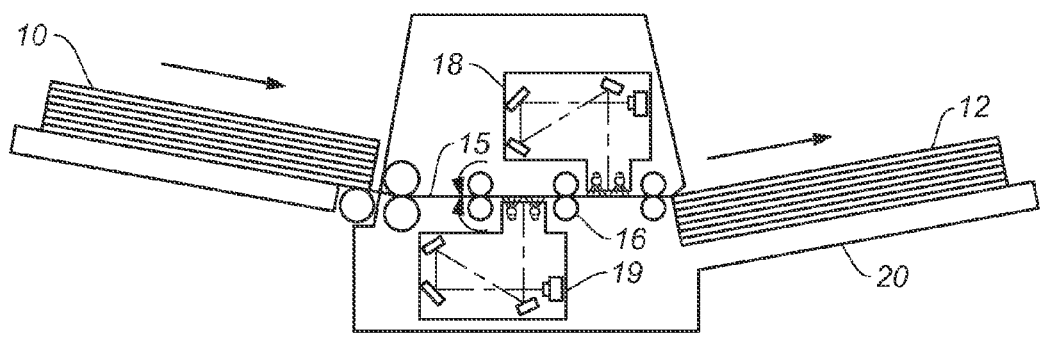
FIG. 3 illustrates a prior art scanner with a straight paper path.
Figure 4:
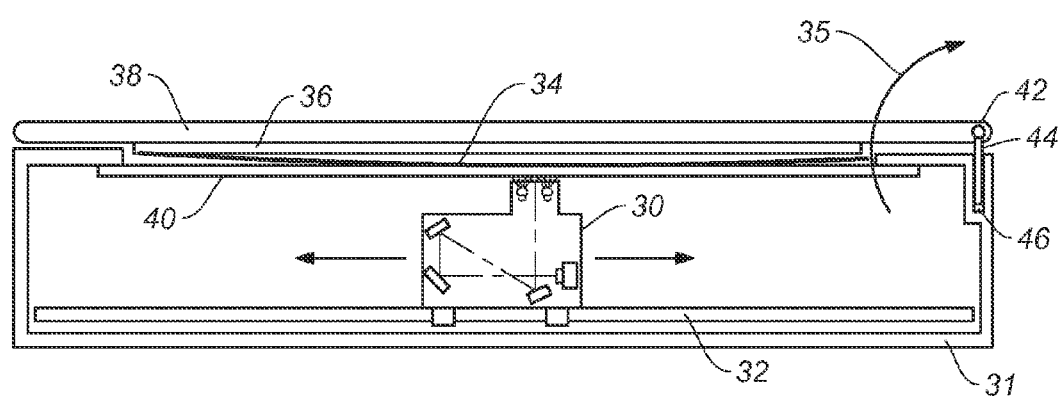
FIG. 4 illustrates a prior art flatbed scanner.
Figure 5:
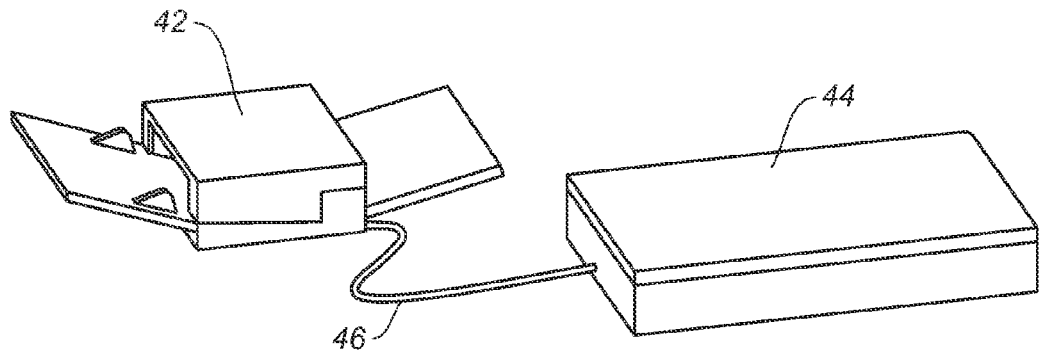
FIG. 5 illustrates a prior art tethered sheet fed and flatbed scanner system.
Figure 6:
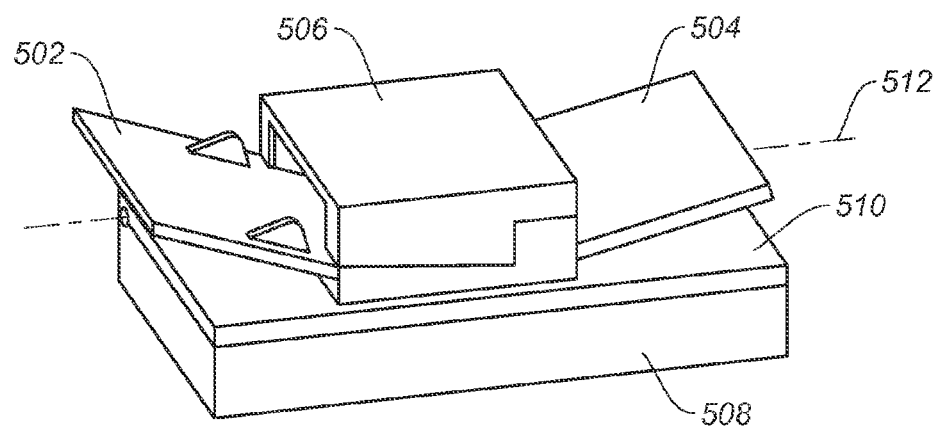
FIG. 6 illustrates a prior art combination sheet fed and flatbed scanner system.
Figure 7:
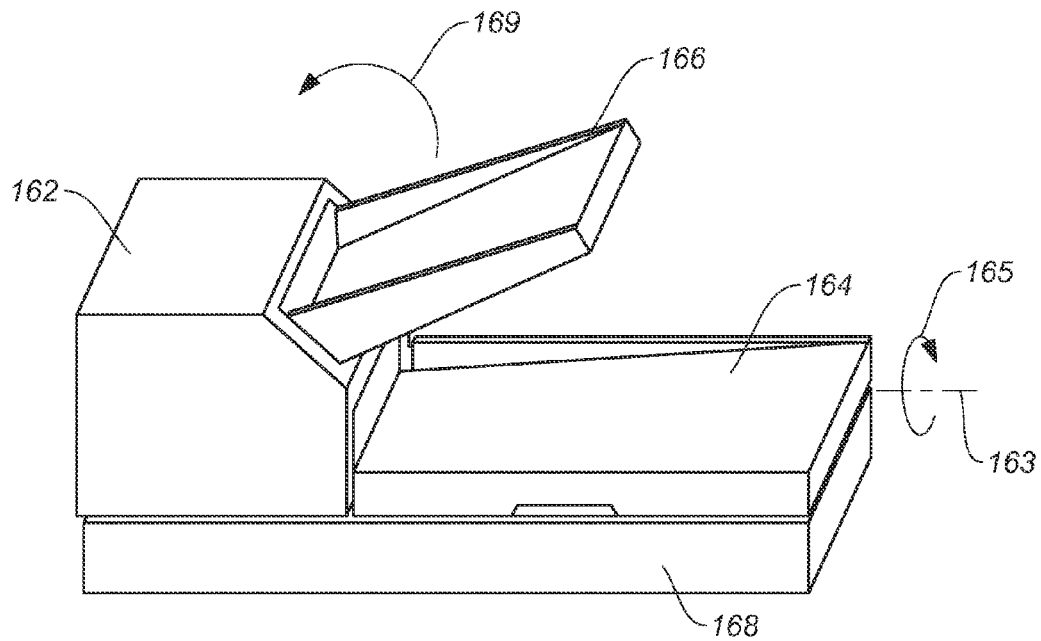
FIG. 7 illustrates a prior art combination rotary and flatbed scanner system.
Figure 8:
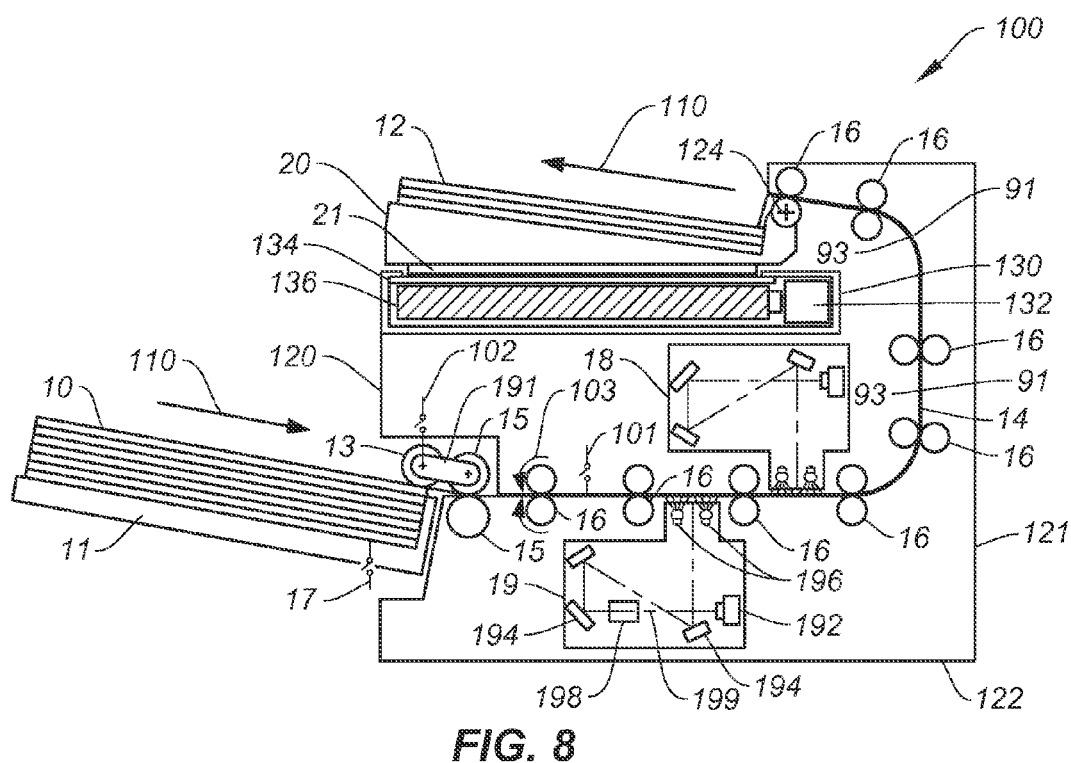
FIG. 8 illustrates an embodiment of the present sheet fed and flatbed scanner system via a lateral side cross-section view.
Figure 9:
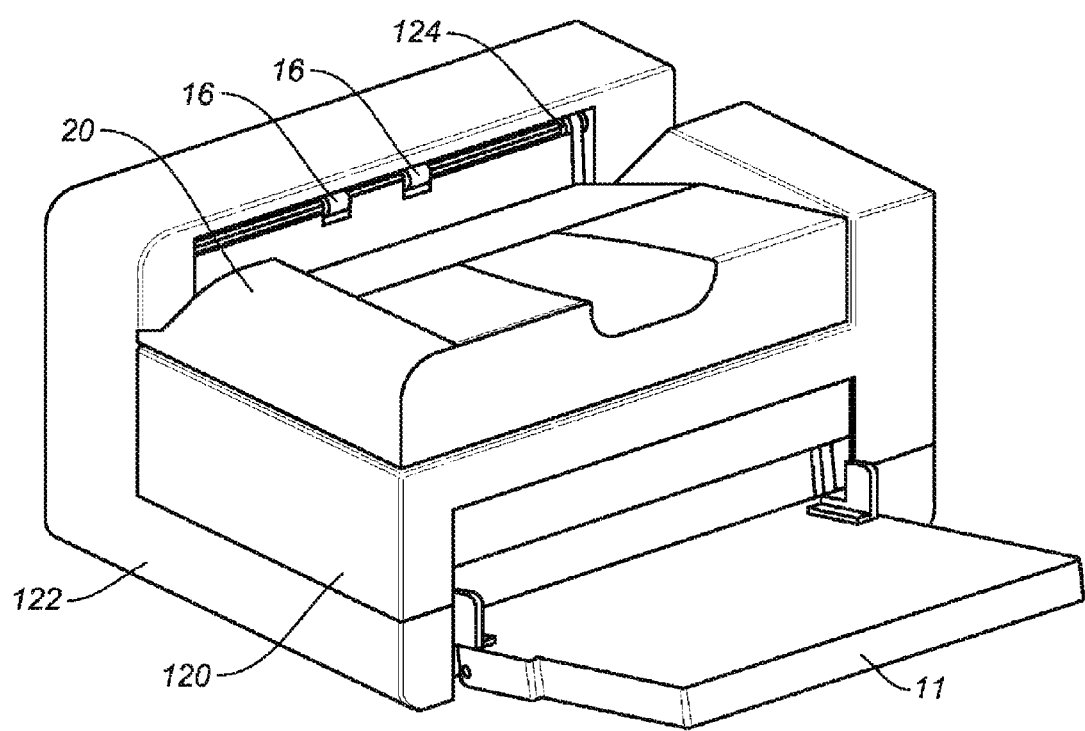
FIG. 9 illustrates a perspective view of the scanner system of FIG. 8.

Referring now to the drawings, FIG. 8 shows a side view cross section through a scanner 100 of a preferred embodiment of the present invention. A back side of the scanner 121, opposite the front side, is to the right in FIG. 8. The scanner is comprised of a stationary base portion 122, a moveable pod portion 120 and a moveable output tray/flatbed cover 20. Pod portion 120 and output tray/flatbed cover 20 can both pivot or rotate relative to each other and together they can pivot/rotate relative to base portion 122, at horizontal hinge axis 124 created by hinge mechanisms described below. The output tray 20 is at an open position when it is rotated upward (see FIGS. 10 and 11) and is in a closed position when it is rotated downward and is adjacent to the flatbed scanner, as is shown in FIG. 8. Scanner 100 provides duplex, sheet fed, C-shaped scanning and flatbed scanning functions. The sheet fed scanner input tray, output tray and the flatbed cover are all situated to face forward toward the human operator located in front of scanner 100, which is to the left in FIG. 8. FIG. 9 illustrates a perspective view of the scanner shown in FIG. 8 with like numerals indicating like elements.

Referring again to FIG. 8, to scan a stack of documents 10, a human operator places them, face up, on elevator input tray 11 which supports the documents and initiates a scan command through an attached computer (not shown) or a button or control panel (not shown) on the scanner. Automatic operation of the scanner then proceeds as follows: drive rollers 16 begin to continuously rotate in direction 103; paper present sensor 17 determines that documents are in elevator input tray 11 and a motor (not shown) raises the tray to position the top of stack 10 against urging roller 13; a motor and/or clutch (not shown) rotate urging rollers 13 and feed rollers 15 to pull the top document from stack 10 and move it into the continuously rotating transport rollers 16 which transport or convey the document through rotary transport path (C-shaped) 14 in direction 110; the documents are imaged by cameras 18 and 19 as they are pulled through the document transport path 14, eventually to be stacked face down in exit tray 20. The cameras include one or more illumination sources 196 that illuminate documents to be imaged by a CCD image sensor 192. The cameras include a lens 198 and one or more mirrors 194 to fold the light path 199 between the imager and the document and create a more compact camera.

Scanned documents 12 are stacked face down in exit tray 20, in the same order as they were fed into the scanner and scanned. When paper edge sensor 101 detects the lead edge of a document, the urging rollers and feed rollers are stopped from rotating to prevent feeding of more than one document. After the trail edge of the document passes by paper edge sensor 101 via rollers 16, the urging rollers 13 and feed rollers 15 are again rotated by motor and/or clutch (not shown) to start moving the next document on the top of stack 10 into transport path 14. In this way, documents are moved one at a time past cameras 18 and 19 to be imaged. Urging roller 13 is mounted to a housing 191, that freely pivots around the axis of the upper feed roller 15, which is attached to the pod portion 120. Therefore as documents are fed from stack 10, urging roller 13 drops by gravity onto the next document at the top of stack 10. Stack-up sensor 102 detects when urging roller 13 (or its surrounding parts) drops below an optimal range for feeding documents. When this occurs, elevator 11 is raised by a motor (not shown) until stack-up sensor 102 detects that the stack is again in an optimal feeding position.

Transport path 14 is formed by surfaces 91 of base portion 122 and surfaces 93 pod portion 120. This transport path is noted as the region between the pod portion and the base portion, with a beginning near the input tray and an exit near the output tray. After documents are scanned, they are advanced into output tray 20 where they are stacked face down, in the same order in which they were placed in input tray 11. Camera 18 resides in pod portion 120 to image the top of fed documents and camera 19 resides in base portion 122 to image the bottom of fed documents. In a preferred embodiment of the present invention, the cameras use CCD imagers. However, these cameras optionally can be either linear CCD imagers or linear contact image sensors (CIS). Located vertically above cameras 18 and 19 and disposed vertically below output tray 20 within pod portion 120 is a flatbed scanner 130. Flatbed scanner 130 includes a clear glass platen 134, for document placement, and a camera 136, which can be either of the linear CIS or linear CCD type that images the underside of documents placed onto glass platen 134. A preferred embodiment of the present invention uses a CIS camera for the flatbed because of its small size. Camera 136 is driven along a gear rack, track, or shaft 86 (shown in FIG. 10) in, or parallel to, the long direction of the flatbed scanner by a motor 132 in a manner common to flatbed scanners.

Figure 10:
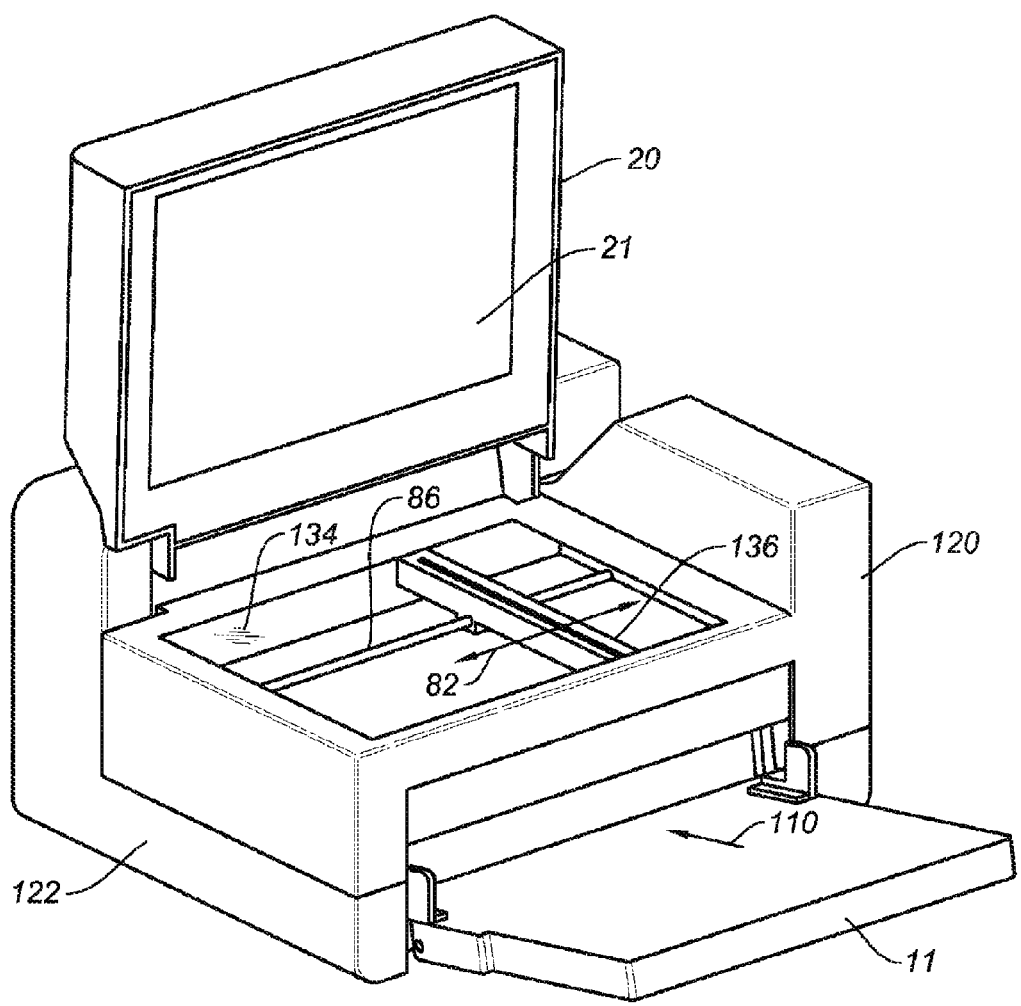
FIG. 10 illustrates a perspective view of the scanner system of FIG. 8 with the output tray/flatbed cover in an open position.

FIG. 10 illustrates a perspective view of the scanner shown in FIG. 9 with output tray 20 in an open position exposing clear glass platen 134. As shown in FIG. 10, flatbed scanner 130 is arranged so that camera 136 moves along direction 82 which is perpendicular to the direction of paper transport through the sheet fed scanner, shown as direction 110. Direction 82 is deemed the long direction of the flatbed scanner and clear glass platen.

Sheet fed scanner output tray 20 also serves as the cover for flatbed scanner 130. Its top surface serves as the output tray and its underside, or bottom surface, acts as a cover for the flatbed scanner. In particular, for the platen of the flatbed scanner. Pad 21 is adhered to the underside of output tray 20 and it forces documents flat against flatbed glass 134 by pressing against them for scanning when closed as shown in FIG. 9. It is preferably formed of a flexible material in order to conform to the shape of documents or items placed on the flatbed platen. To place a document into scanner 100 for flatbed scanning, output tray 20 is lifted as shown in FIG. 10, pivoting about horizontal axis 124 (FIG. 8) and exposing platen glass 134 for document placement.

Figure 11:
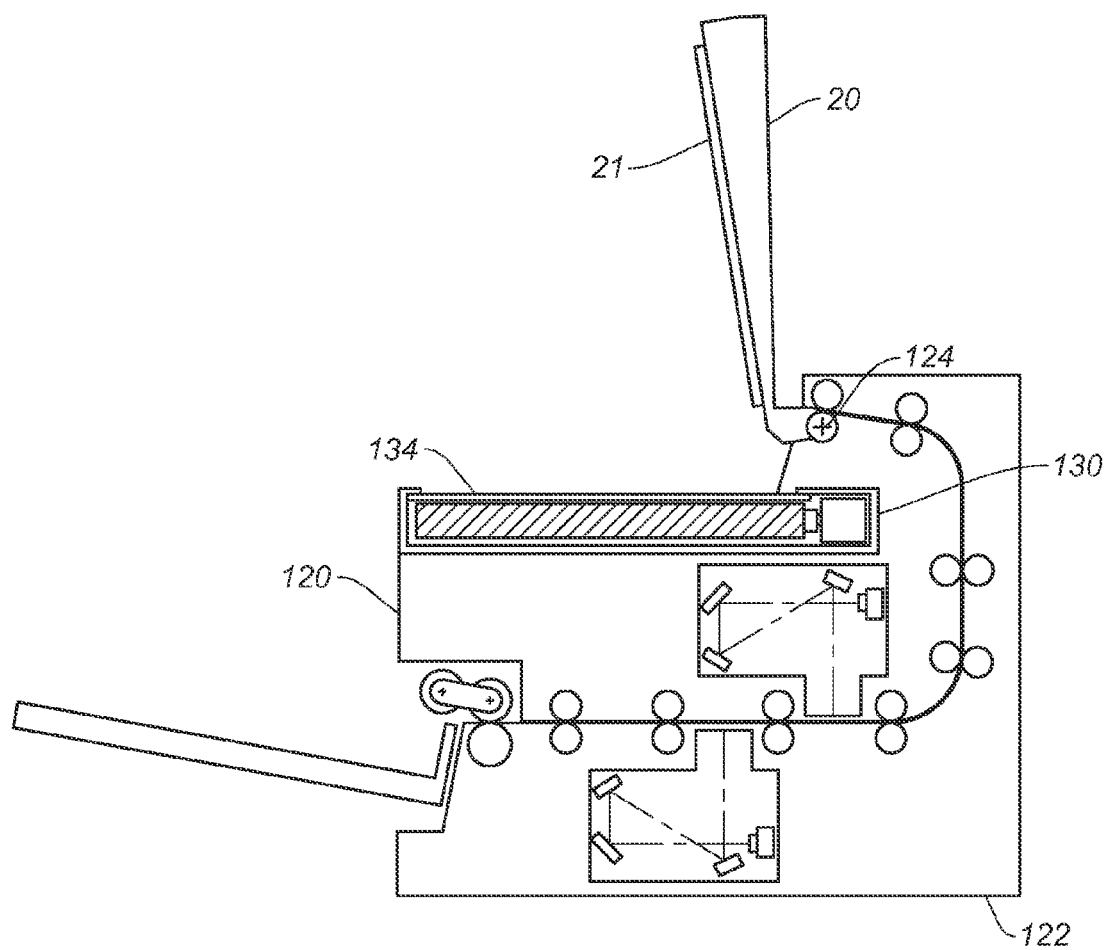
FIG. 11 illustrates a lateral side cross-section view of the scanner apparatus of FIG. 10.
Figure 12:
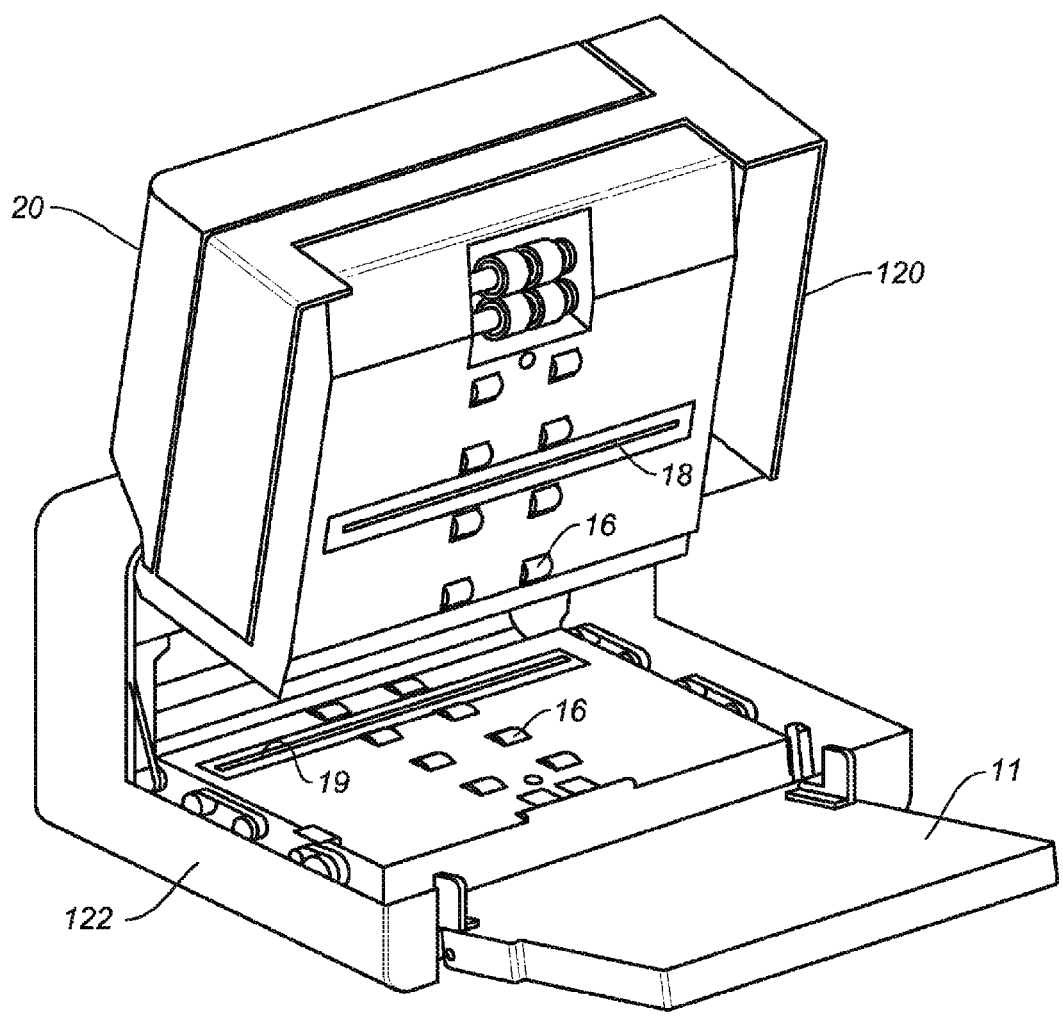
FIG. 12 illustrates a perspective view of the scanner system of FIG. 8 with the pod portion in an open position.
Figure 13:
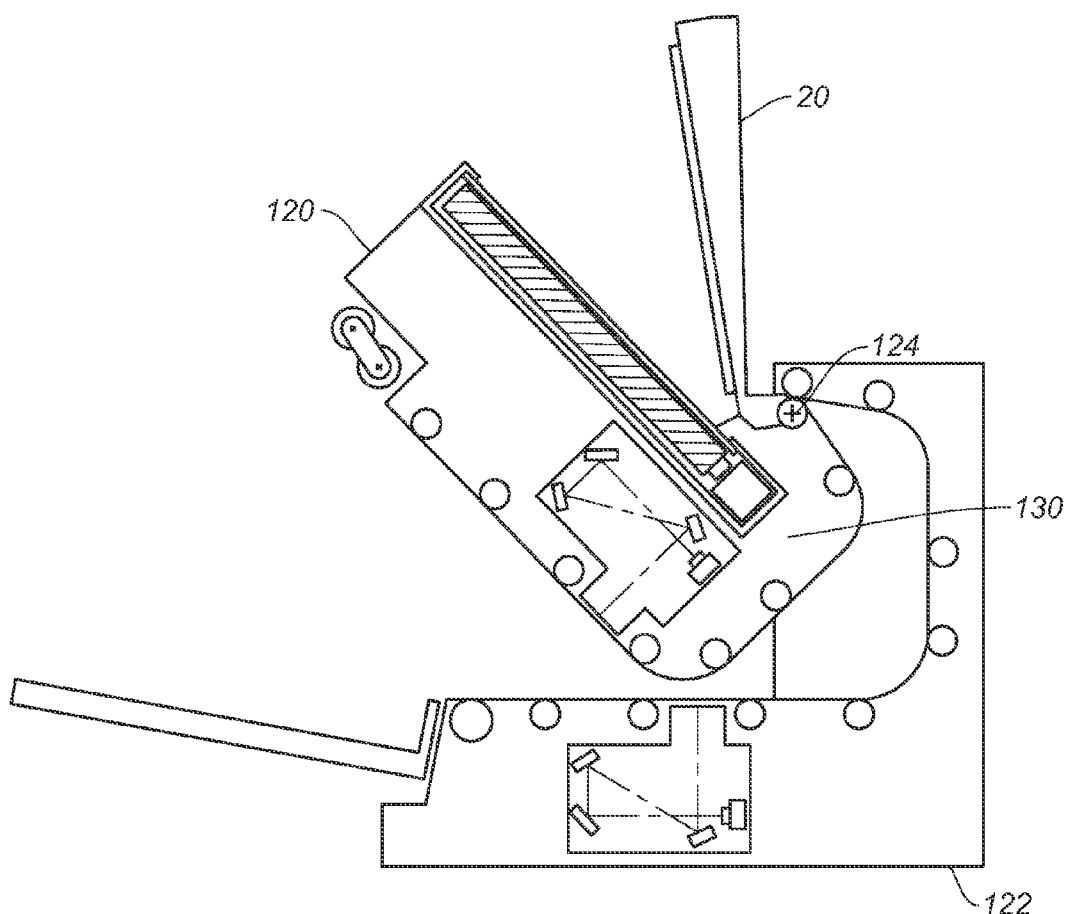
FIG. 13 illustrates a lateral side cross-section view of the scanner apparatus of FIG. 12.

FIG. 11 is similar to FIG. 8 in that it shows a side view cross section through scanner 100 but with cover 20 in an open position, also pivoted about horizontal axis 124, while FIG. 12 is a perspective view of a scanner 100, similar to FIG. 9, but with pod 120 pivoted to an open position, and FIG. 13 shows a side view cross section through the scanner 100 as shown in FIG. 12 with pod 120 in an open position, with like numerals indicating like elements throughout the figures. As shown in FIGS. 11 and 13, output/exit tray 20 pivots about the same horizontal axis 124 created by the hinge mechanisms as the pod 120. The output tray and pod pivot or rotate independently about this axis as shown, for example, in FIG. 13, which also illustrates the further axial reach of the output tray 20 as compared to the pod 120.

Figure 14A:
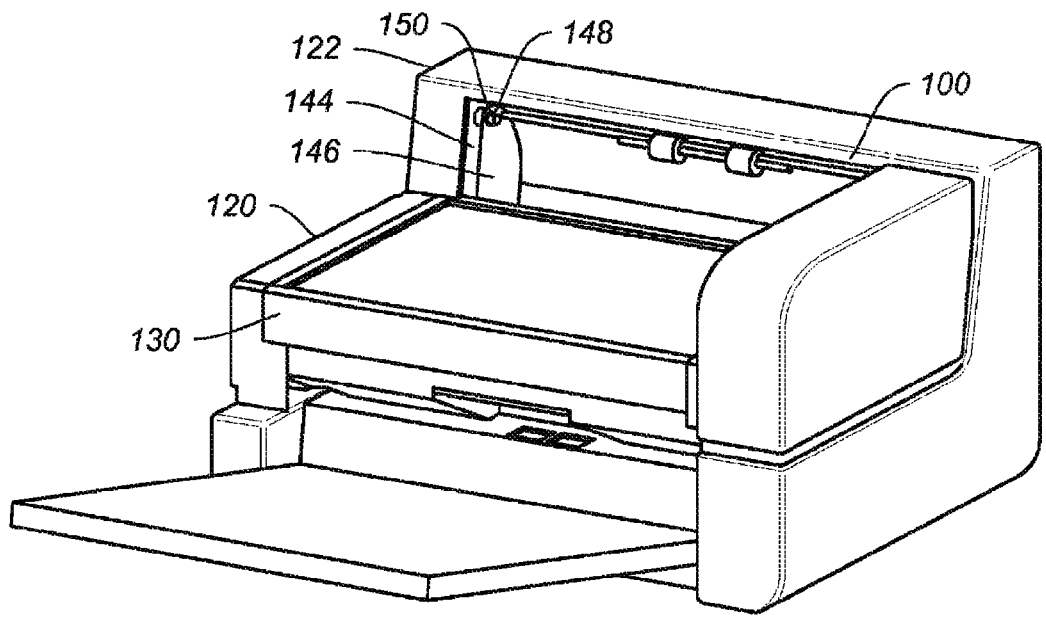
FIG. 14A illustrates a perspective view of an optional embodiment of the scanner system of FIG. 8 with the output tray/flatbed cover removed to expose one of the hinge mechanisms.
Figure 14B:
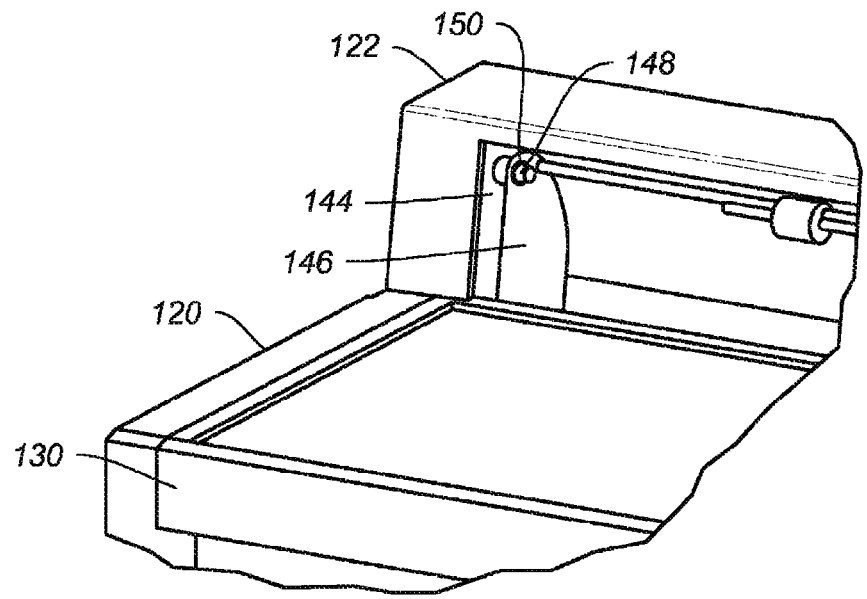
FIG. 14B illustrates a close-up of a portion of FIG. 14.
Figure 14C:
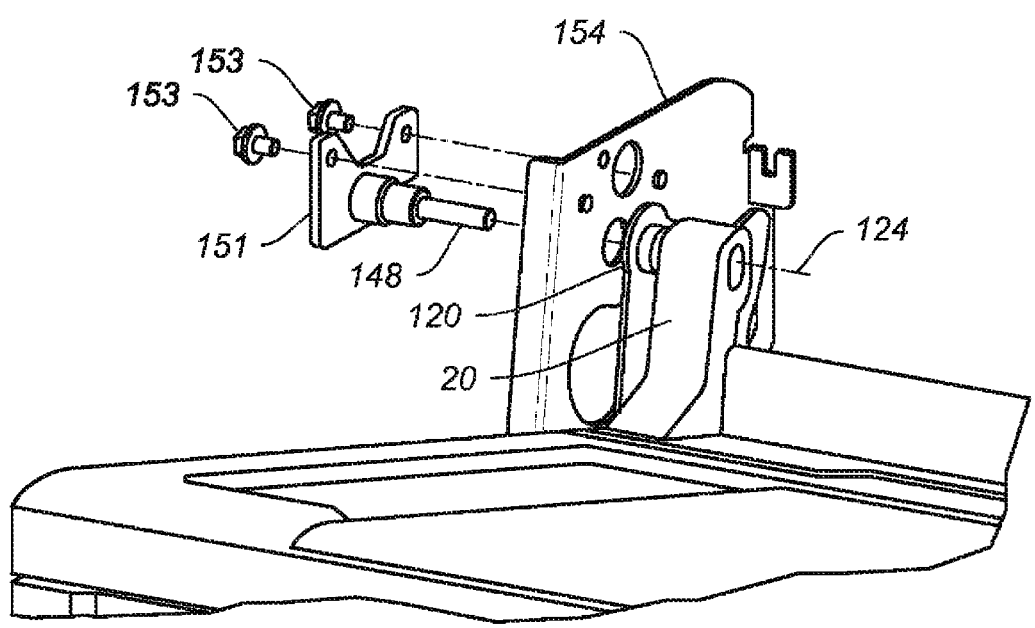
FIG. 14C illustrates an exploded view of a portion of FIG. 14A with base housing removed.
Figure 15A:
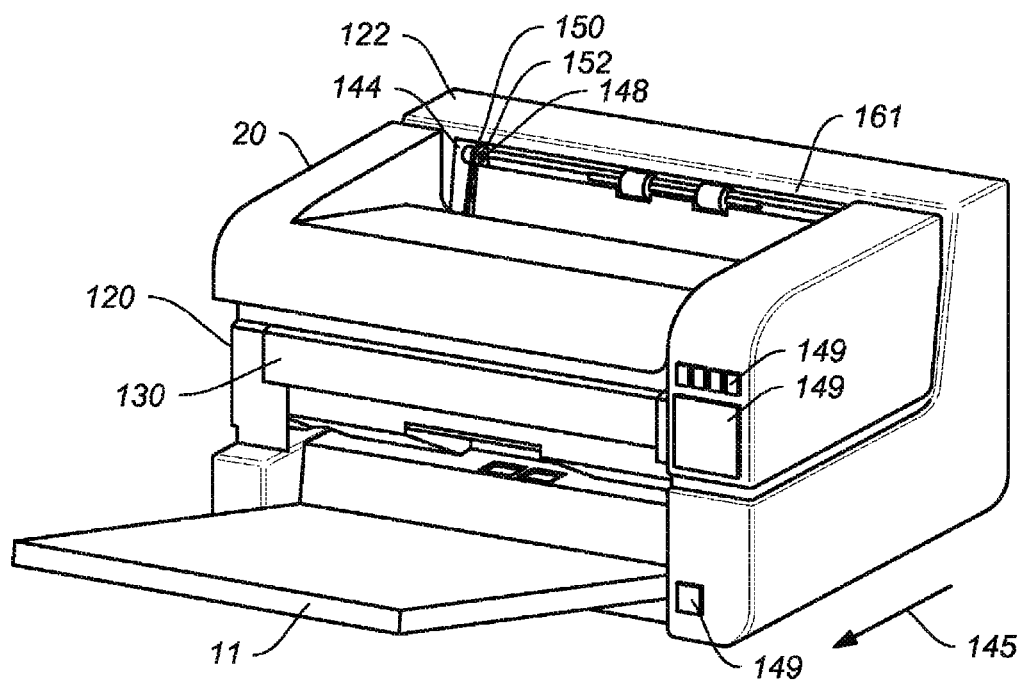
FIG. 15A illustrates a perspective view of an optional embodiment of the scanner system of FIG. 8.
Figure 15B:
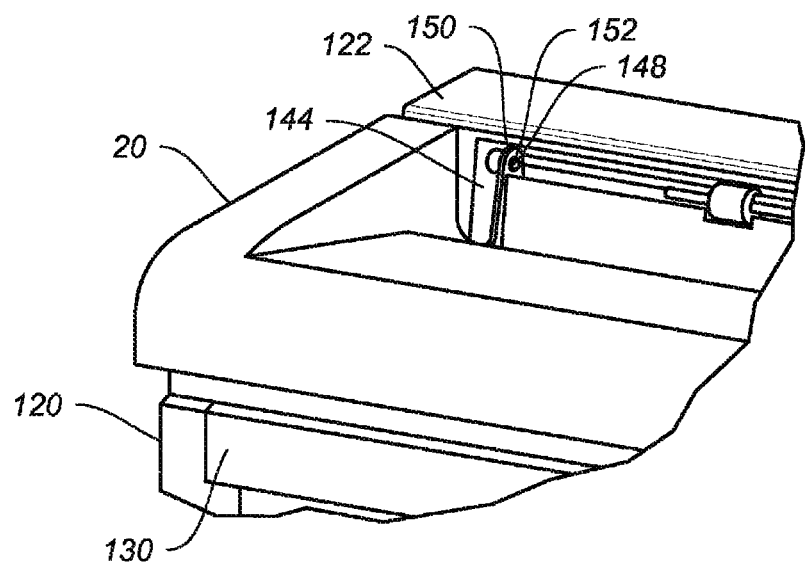
FIG. 15B illustrates a close-up of a portion of FIG. 15.

FIGS. 14A-C and 15A-B show a preferred embodiment of the hinge mechanisms forming axis 124. In FIGS. 14A-C the output tray 20 has been removed to show the hinge mechanisms portion on one side of the pod portion 120. Pod portion 120 is pivotally attached to base portion 122 via these hinge mechanisms. Bearing 150 is pressed into wall 146 of pod portion 120. Bearing 150 rotates about post 148, which is affixed to wall 144 of base portion 122. Referring to the detail of FIG. 14C, which has base housing removed to expose base frame 154, hinge post 148 is welded or riveted to metal plate 151, which is secured to the base frame 154 with screws 153. To assemble the scanner, the pod 120 is positioned in the base to align its bearing with the pivot axis location 124, then the output tray (flatbed cover) 20 is likewise positioned at the axis. Then the plate 151 with hinge post 148 is screwed onto the base frame 154. A similar hinge/bearing arrangement at location 160, collinear with the hinge mechanism shown, completes the pod hinge mechanisms. FIGS. 15A-B show output tray 20 pivotally attached to base portion 122, via the hinge mechanisms, over the same post 148. In this case, an opening 152 in wall 150 of the output tray fits over post 148. A similar bearing arrangement at location 161 completes the output tray hinge mechanisms. FIG. 16 shows a preferred embodiment of opening 152 to be a slot that is oriented vertically when output tray 20 is in the closed position. This slot configuration allows output tray 20 to fully seat against thick or irregularly shaped documents that are placed on the platen for scanning.

As shown in FIG. 15, primary user controls and/or displays 149 are positioned on surfaces that face forward toward the front of the scanner in direction 145, which define those surfaces as the front of the machine. Output tray 20 and input tray 11 extend in the same direction to provide forward facing access for the most ergonomic user interface.

This configuration affords all the ergonomic benefits of the traditional rotary or C-shaped sheet fed scanner—high capacity input tray with ergonomic position close to the table surface, forward-facing trays with minimal span between them to minimize reach, forward-facing single hinge access to the rotary paper path—while also offering ergonomic flatbed scanning for exception documents even when the sheet fed input and output trays are filled with documents.

The invention claimed is:

1. A method comprising:
providing a flatbed scanner and a sheet fed scanner;
supporting a document to be scanned by the sheet fed scanner in an input tray;
transporting the document from the input tray, then under the flatbed scanner, then past a pair of imaging devices each for scanning a different side of the document, then behind the flatbed scanner, and then into an output tray, the output tray forming the top surface of a cover for the flatbed scanner.

2. The method of claim 1 further comprising providing an urging roller at the input tray for urging the document from the input tray toward a document transport path.

3. The method of claim 2 further comprising providing feed rollers along the document transport path for transporting the document from the input tray to the output tray.

4. A method comprising:
providing a scanning machine having a sheet fed scanner and a flatbed scanner;
supporting a document in an input tray of the scanning machine;
conveying the document along a transport path through the scanning machine;
imaging two sides of the document in a portion of the transport path below the flatbed scanner; and
outputting the scanned document in an output tray, the output tray forming the top surface of a cover for the flatbed scanner.

5. The method of claim 4, further comprising attaching the output tray to the scanning machine such that the output tray is rotatable to an open position to expose a platen of the flatbed scanner and the output tray is rotatable to a closed position to cover the platen of the flatbed scanner.

6. The method of claim 5, further comprising disposing the flatbed scanner in a pod portion of the scanning machine, including attaching the pod portion to the scanning machine such that the pod portion is rotatable to an open position to expose the transport path.

7. The method of claim 6, wherein the steps of attaching the output tray and attaching the pod portion include attaching the output tray and the pod portion to a same hinge mechanism of the scanning machine such that the output tray and the pod portion both rotate about a same axis of rotation.

8. The method of claim 5, further including affixing a pad to a bottom surface of the output tray such that the pad contacts the platen when the output tray is rotated to the closed position.

* * * * *